United States Patent
Zachovalova et al.

(10) Patent No.: US 8,997,783 B2
(45) Date of Patent: Apr. 7, 2015

(54) PLASTIC HOUSING

(75) Inventors: Jelena Zachovalova, Holesov (CZ); Zdenek Frcek, Kamenny Ujezd (CZ); Bedrich Gaidarus, Dobva Voda u C.B. (CZ); Martin Krystof, Ceske Budejovice (CZ)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 13/535,729

(22) Filed: Jun. 28, 2012

(65) Prior Publication Data

US 2013/0001125 A1 Jan. 3, 2013

(30) Foreign Application Priority Data

Jun. 30, 2011 (DE) .......................... 10 2011 078 467

(51) Int. Cl.
*F02M 37/22* (2006.01)
*B01D 27/08* (2006.01)
*F16L 11/127* (2006.01)
*B01D 35/30* (2006.01)

(52) U.S. Cl.
CPC ............... *B01D 35/30* (2013.01); *F02M 37/22* (2013.01); *B01D 2201/50* (2013.01)

(58) Field of Classification Search
USPC ........ 137/544, 351, 377; 210/243; 206/524.2; 361/215
See application file for complete search history.

(56) References Cited

U.S. PATENT DOCUMENTS

| 4,592,836 | A | * | 6/1986 | Chiao ........................... 210/243 |
| 5,076,920 | A | | 12/1991 | Danowski et al. |
| 5,798,048 | A | | 8/1998 | Ries |
| 6,589,420 | B1 | * | 7/2003 | Mathew ........................ 210/243 |
| 6,807,948 | B2 | * | 10/2004 | Kanamaru et al. ............. 123/495 |
| 7,455,768 | B2 | | 11/2008 | Hundley et al. |
| 7,607,419 | B2 | | 10/2009 | Rumpf |
| 2005/0178707 | A1 | | 8/2005 | Girondi |
| 2009/0230674 | A1 | * | 9/2009 | Villaire et al. ................. 285/179 |

FOREIGN PATENT DOCUMENTS

| DE | 19844559 | 3/2000 |
| DE | 102007006004 | 8/2008 |
| JP | 11030163 | 2/1999 |
| WO | 2009095346 | 8/2009 |

* cited by examiner

*Primary Examiner* — Atif Chaudry
(74) *Attorney, Agent, or Firm* — Michael Best & Friedrich LLP

(57) ABSTRACT

A liquid filter housing which comprises a housing pot of two-layered configuration and a housing cover closing the housing pot. The housing pot and the housing cover mutually enclose an interior, wherein the inner layer of the housing pot facing the interior is manufactured from an electrically conductive plastic material and the outer layer of the housing pot facing away from the interior from an electrically insulating plastic material. An especially good mechanical connection is achieved between the two layers by the inner layer and the outer layer being connected to one another in a positive-locking manner.

15 Claims, 1 Drawing Sheet

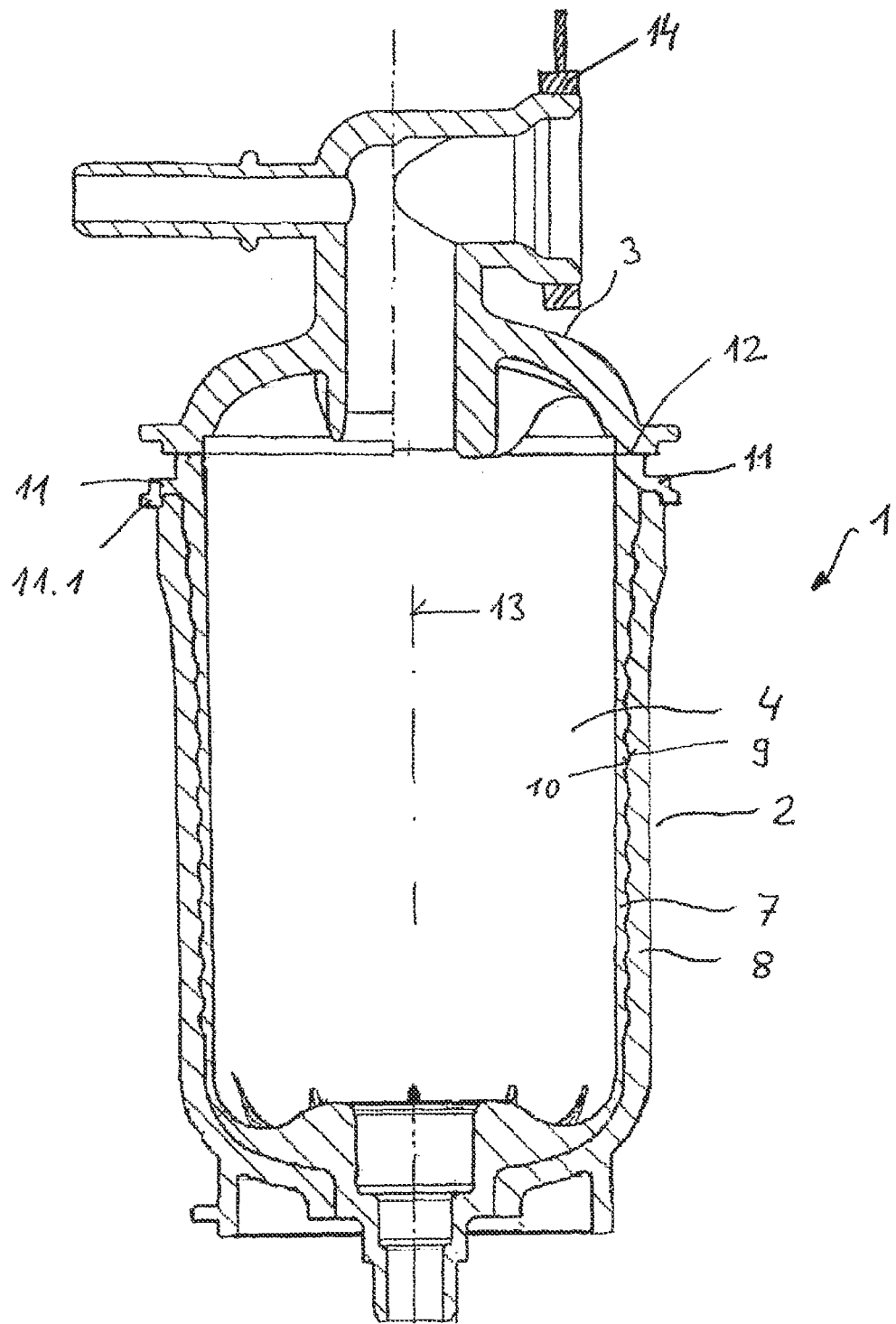

PLASTIC HOUSING

BACKGROUND OF THE INVENTION

The invention is based on a plastic housing.

A liquid filter housing is already known from the WIPO patent application WO 2009/095346 A1 which comprises a housing pot of two-layered configuration and a housing cover which closes the housing pot. Said housing pot and said housing cover mutually enclose an interior, wherein the inner layer of the housing pot which faces the interior is manufactured from an electrically conductive plastic material and the outer layer of the housing pot which faces away from the interior from an electrically insulating plastic material. By means of the two-layered embodiment of the filter housing, electrostatic charges can be led away from the interior of said filter housing to an electrical ground. The disadvantage is that the mechanical connection between the two layers of the housing pot can loosen due to different shrinkage of the two materials. By the inner layer being guided through the outer layer, the electrically conductive inner layer is furthermore connected in a complex manner to an electrical terminal for leading away the electrical charges. This can lead to permeability as well as to a reduction of the mechanical properties of the plastic housing due to the notch effect.

In addition, the German patent publication DE 10 2007 006 004 A1 discloses a process for manufacturing the entire plastic housing from an electrically conductive plastic material. The disadvantage with this is that the electrically conductive plastic material is considerably more expensive than an electrically non-conductive plastic material.

SUMMARY OF THE INVENTION

The inventive plastic housing has in contrast the advantage that an especially good mechanical connection is achieved between the two layers by the inner layer and the outer layer of the housing pot being connected to one another in a positive-locking manner. In addition to the positive-locking connection, a force fit also results between the two layers. This is due to the fact that a mechanical pretension develops between the two layers as a result of the two-component injection molding process, said pretension further improving the mechanical properties of the plastic housing, in particular the resistance to creep. As a result of the two-layered embodiment of the plastic housing, only a portion of the housing has to be manufactured from the expensive electrically conductive plastic material; and therefore the manufacturing costs are significantly reduced.

It is particularly advantageous if the positive-locking connection is achieved in such a way that raised portions are provided on one of the layers, which interact in a positive-locking manner with and project into complementary recesses, which are configured on the other layer.

According to an advantageous embodiment, the raised portions and the recesses are of annular design and run in the circumferential direction. It is advantageous if said raised portions and said recesses do not have sharp edges but are rounded by design, i.e. have radii at the transitions. In so doing, stress peaks are prevented at the raised portions and recesses, and therefore an especially good mechanical connection and a high resistance to creep are achieved between the two layers.

It is furthermore advantageous if a plurality of annular raised portions or respectively recesses are successively arranged as viewed in the axial direction such that a wavelike contour results on the inner layer or respectively on the outer layer. In this way, an especially good positive-locking connection is achieved, which can also be easily manufactured in terms of processability.

It is very advantageous if the inner layer comprises a collar on a section facing the housing cover. The collar engages behind the outer layer because in this way an additional radial pretension is produced at the end face end between the two layers and a good sealing between the two surfaces is thereby achieved. As a result, no plastic can, for example, penetrate between the two layers and thus cause delamination.

According to an advantageous embodiment, the inner layer of the housing pot consists of a polyoxymethylene plastic (POM), to which electrically conductive particles or fibers are added. The use of POM as basis material of the electrically conductive plastic is particularly cost effective in comparison to other electrically conductive plastic materials. Furthermore, the outer layer of the housing pot advantageously consists of a polyoxymethylene plastic (POM). The housing cover consists of a polyoxymethylene plastic (POM) and like the housing pot contains electrically conductive particles or fibers.

It is also advantageous for the housing cover to have an electrical terminal to lead away electrostatic charges. In this way, the electrostatic charges coming from the housing pot via the connection to the housing cover can be led away by means of the electrical terminal at the housing cover.

In addition, it is advantageous if the plastic housing is a plastic filter or a valve, for example a pressure control valve, because an electrostatic discharge is mandatory especially for these components of a fuel delivery unit.

BRIEF DESCRIPTION OF THE DRAWING

An exemplary embodiment of the invention is depicted in a simplified manner in the drawing and is explained in detail in the following description.

DETAILED DESCRIPTION

The drawing shows a sectional view of a plastic housing according to the invention, which is embodied by way of example as a filter housing and contains a filter medium that is not depicted. The plastic housing can however explicitly constitute any other desired housing.

The plastic housing 1 comprises a housing pot 2 configured as two layers and a housing cover 3 which closes the housing pot 2. Said housing pot 2 and the housing cover 3 mutually enclose an interior 4. An inner layer 7 of said housing pot 2 facing the interior 4 is manufactured from an electrically conductive plastic material and an outer layer 8 of said housing pot 2 facing away from the interior 4 from an electrically insulating plastic material. By means of the two-layered configuration of said housing pot 2, electrostatic charges can be led away from the interior of said filter housing to an electrical ground.

Provision is made according to the invention for the inner layer 7 and the outer layer 8 of the housing pot 2 to be connected to one another in a positive-locking manner. In this way, an especially good mechanical connection is achieved between the two layers. The resistance to creep of the plastic housing 1 is particularly high.

The positive-locking connection is produced in such a way that raised portions 9 are provided on one of the two layers 7, 8, which interact in a positive-locking manner with and project into complementary recesses 10, which are configured on the other of the two layers 7, 8. According to the exemplary embodiment, the raised portions 9 and the recesses 10 are each case of annular design and run in the circumferential direction of the housing pot 2, for example over the entire circumference. Of course, said raised portions 9 and said recesses 10 can also be interrupted in the circumferential direction and thereby be of partial annular design. According to the exemplary embodiment, said raised portions 9 and said recesses 10 have in each case a circular-segmented cross section. In so doing, said raised portions 9 and the recesses 10 are rounded at the transitions. By providing said raised portions 9 and recesses 10 with appropriate radii, stress peaks do not occur at the former or the latter. For example, a plurality of annular raised portions 9 or respectively recesses 10 can be successively arranged in the axial direction as seen with regard to a longitudinal axis 13 such that a wavelike contour results at the interface between the inner layer 7 and the outer layer 8. Said raised portions 9 or recesses 10 are provided in the exemplary embodiment only on the lateral surface of the housing pot 2 and not on the bottom of said housing pot 2 because they primarily are to form a positive-locking connection in the axial direction with respect to the longitudinal axis 13. The force fit acts in the radial direction between the two layers 7, 8.

As an alternative, the raised portions 9 and the recesses 10 can also be designed in another way, for example, such that a plurality of peninsular raised portions 9 and recesses 10 are arranged so as to be distributed selectively on the circumference and to be of annular or oval shaped design when viewed in the radial direction.

The inner layer 7 of the housing pot 2 has at least one collar or one shoulder 11 on a section facing the housing cover 3, for example, on the end face facing the housing cover 3, said collar or said shoulder engaging behind the outer layer 8 with an undercut 11.1 that is, for example, annularly configured and circulates in the circumferential direction. Said collar or said shoulder 11 is provided on the end face end of the outer layer 8, said end face end being oriented towards the housing cover 3. In this way, an additional radial pretension is produced between the two layers 7, 8 on the side of the housing pot 2 facing the housing cover 3, said pretension causing a good sealing between said two layers 7, 8. As a result, a liquid located in the interior 4 of the plastic housing 1 cannot move between said two layers 7, 8, whereby delamination of the layers 7, 8 could take place.

According to the exemplary embodiment, the inner layer 7 of the housing pot 2 consists of a polyoxymethylene plastic (POM) and contains electrically conductive particles or fibers, for example soot particles. The outer layer 8 of the housing pot 2 consists, for example, of a polyoxymethylene plastic (POM). The housing cover 3 consists, for example, of a polyoxymethylene plastic (POM) and likewise contains electrically conductive particles or fibers, for example soot particles. Of course, other plastic materials can also be used in each case.

The housing pot 2 and the housing cover 3 are fixedly connected to one another, for example welded or bonded with an electrically conductive adhesive. The housing cover 3 is, for example, designed as a single layer. Said housing cover 3 can however, of course, also be designed as two layers.

The electrically conductive housing cover 3 is configured such that it connects to the inner layer 7 of the housing pot 2 at a joint area 12. The deflection of the electrostatic charges occurs, for example, via an electrical terminal 14 which is provided on the housing cover 3 and contacts the electrically conductive housing cover 3, for example flatly touches the same. The electrical terminal 14 could however also be embodied as a tag connector, which projects into the material of said housing cover 3. The electrostatic charges on the inner layer 7 can flow off onto said housing cover 3 by means of the contact between the inner layer 7 of the housing pot 2 and said housing cover 3 and be led away via the electrical terminal 14.

The housing pot 2 is manufactured by means of a so-called two-component injection molding process by the inner layer 7 being initially injection molded in a first step and the outer layer 8 being injected onto the inner layer 7 in a second step.

The plastic housing 1 according to the invention can be used, for example, in a fuel delivery module for each component which fuel runs through, and therefore a simple and cost effective electrostatic discharge is made possible. The plastic housing 1 according to the invention can also be a valve housing of a fuel delivery module.

The invention claimed is:

1. A plastic housing comprising a housing pot (2) of two-layered configuration and a housing cover (3) that closes the housing pot (2), which mutually enclose an interior (4), wherein an inner layer (7) of said housing pot (2) facing the interior (4) is made of an electrically conductive plastic material and an outer layer (8) of said housing pot (2) facing away from the interior (4) is made of an electrically insulating plastic material, characterized in that said inner layer (7) and said outer layer (8) of said housing pot (2) have a positive-locking connection, characterized in that the inner layer (7) has a collar (11) with an undercut on a section facing the housing cover (3), said collar engaging behind the outer layer (8).

2. The plastic housing according to claim 1, characterized in that the positive-locking connection is includes raised portions (9) on one layer (7, 8), which project into complementary recesses (10) on the other layer (7, 8).

3. The plastic housing according to claim 2, characterized in that the raised portions (9) and the recesses (10) are annularly configured and run in the circumferential direction of the housing pot (2).

4. The plastic housing according to claim 3, characterized in that a plurality of annular raised portions (9) or recesses (10) are successively arranged as viewed in an axial direction such that a wavelike contour results on the inner layer (7) or on the outer layer (8).

5. Plastic housing according to claim 4, characterized in that the inner layer (7) of the housing pot (2) consists of a polyoxymethylene plastic (POM) and contains electrically conductive particles or fibers.

6. The plastic housing according to claim 5, characterized in that the outer layer (8) of the housing pot (2) consists of a polyoxymethylene plastic (POM).

7. The plastic housing according to claim 6, characterized in that the housing cover (3) consists of a polyoxymethylene plastic (POM) and contains electrically conductive particles or fibers.

8. The plastic housing according to claim 7, characterized in that the housing cover (3) has an electrical terminal (14) to lead away electrostatic charges.

9. The plastic housing according to claim 1, characterized in that a plurality of annular raised portions (9) or recesses (10) are successively arranged as viewed in an axial direction such that a wavelike contour results on the inner layer (7) or on the outer layer (8).

10. Plastic housing according to claim 1, characterized in that the inner layer (7) of the housing pot (2) consists of a polyoxymethylene plastic (POM) and contains electrically conductive particles or fibers.

11. The plastic housing according to claim 1, characterized in that the outer layer (8) of the housing pot (2) consists of a polyoxymethylene plastic (POM).

12. The plastic housing according to claim 1, characterized in that the housing cover (3) consists of a polyoxymethylene plastic (POM) and contains electrically conductive particles or fibers.

13. The plastic housing according to claim 1, characterized in that the housing cover (3) has an electrical terminal (14) to lead away electrostatic charges.

14. A fuel filter comprising a plastic housing according to claim 1.

15. A valve having a plastic housing according to claim 1.

* * * * *